No. 666,824. Patented Jan. 29, 1901.
L. T. SMITH.
VALVE FOR PNEUMATIC TIRES.
(Application filed June 9, 1900.)
(No Model.)
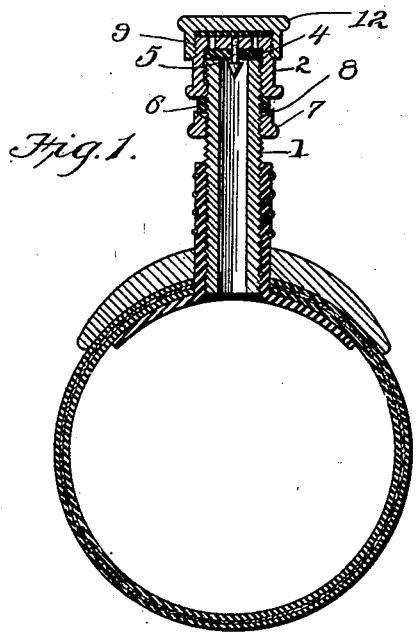
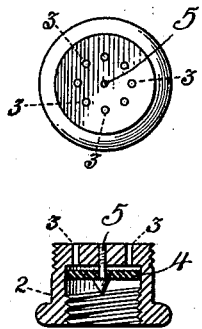
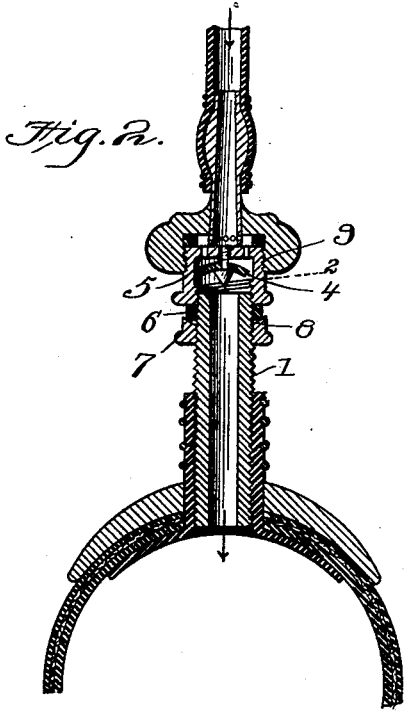
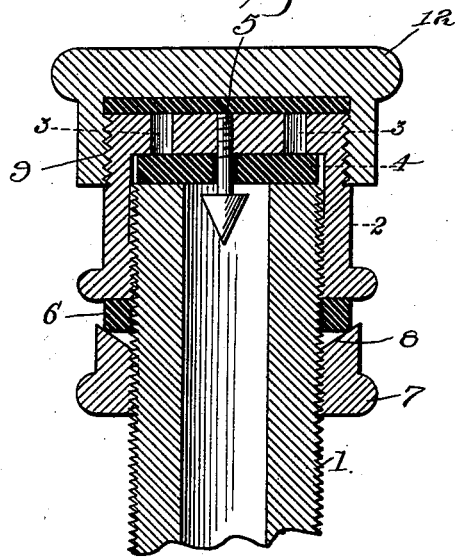
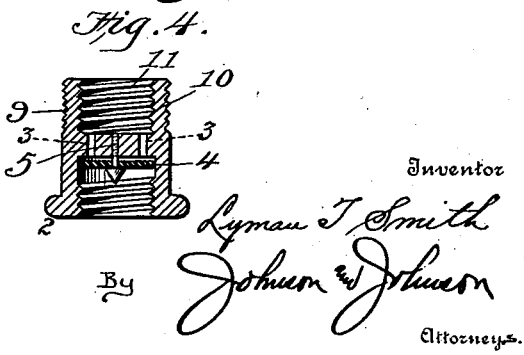
Witnesses
E. W. Hart
Thomas P. Brett
Inventor
Lyman T. Smith
By Johnson & Johnson
Attorneys.
THE NORRIS PETERS CO., PHOTO-LITHO., WASHINGTON, D. C.

UNITED STATES PATENT OFFICE.

LYMAN T. SMITH, OF NEW HAVEN, CONNECTICUT.

VALVE FOR PNEUMATIC TIRES.

SPECIFICATION forming part of Letters Patent No. 666,824, dated January 29, 1901.

Application filed June 9, 1900. Serial No. 19,699. (No model.)

*To all whom it may concern:*

Be it known that I, LYMAN T. SMITH, a citizen of the United States, residing at New Haven, in the county of New Haven and State of Connecticut, have invented certain new and useful Improvements in Valves for Pneumatic Tires, of which the following is a specification.

For pneumatic tires I have produced an improved valve whereby the tire may be inflated and the sealing rendered perfect, and the particular improvement will be pointed out in the claims concluding this specification.

In the accompanying drawings, Figure 1 shows the pneumatic tire in cross-section with my improved sealing-valve applied to the pump-connecting stem of the tire when the latter is sealed. Fig. 2 is a similar view showing the valve in open position and the tire connection made with the pump when inflating the tire. Fig. 3 shows the valve-cap in top and section views. Fig. 4 shows a modification of the valve-cap. Fig. 5 shows enlarged, in section, the suspended valve as sealed.

The tubular stem 1, forming the valve-seat, is secured to the tire in any suitable manner and opens into its interior. It has an external screw-thread upon which a cap 2, having an interior screw-thread, is fitted and which has a multiple of holes 3 in its head near its circumference and coincident with the valve-seating top of the stem. A disk valve 4, preferably of rubber, having a diameter sufficient to cover the holes in the cap and to be seated upon the top of the stem, is suspended by a central pin 5, fixed in the cap, and the length of this pin is sufficient to allow the valve to open to uncover the holes in the cap when the cap is unscrewed and raised from its sealing-stem seat. Preferably the head of the pin is cone-shaped the better to allow the valve-disk by its central opening to be pressed over the head upon the pin. The removal of the cap allows the valve to be quickly removed and replaced upon the pin. The driving of the cap upon the stem presses the valve between the cap-head and the top of the stem and seals the holes in the cap-head. To reinforce and render the seal as perfect as possible, a supplemental seal is provided by a ring-packing 6 at the inner end of the cap for sealing the joint of its screw-threaded connection with the stem. This ring-packing closely fits the external screw-threads of the stem, and a clamp-screw collar or follower 7 on the stem binds the ring-packing at the cap-joint and prevents leakage. The most important office of the ring-packing is to seal the screw connection of the cap with the stem during inflation and while the suspended valve is open. The binding or sealing surface of the screw collar or follower 7 is higher at its periphery and inclines toward its center, forming a wedge-shaped binding and sealing surface 8, impinging upon the ring-packing and compressing it inward toward the stem, as in Fig. 5.

The cap has an external screw-thread 9, whereby to make the pump-tube connection, and when the cap is opened for inflation the disk valve will be suspended upon the head of the pin and assume the form shown in Fig. 2, the circumference of the valve being pressed down from the inner walls of the cap and free of the seat of the stem by the inward flow of air from the pump.

In Fig. 4 I have shown the cap having a head-projecting part 10 to furnish an interior wall screw-thread 11 to suit pump tubular connections having an external screw-thread, so that the connection can be made with a pump-tube nozzle having either an external or internal screw-thread.

The ordinary dust-proof cap 12 is used, as in Fig. 1.

The use of the suspended disk valve is not limited to any particular form of cap.

I claim—

1. A valve for pneumatic tires comprising a screw-cap having holes in its head, a flexible disk valve and a pin centrally suspending the valve within the cap in combination with the valve-seating screw-stem of the tire.

2. A valve for pneumatic tires comprising a screw-cap having holes in its head, a flexible disk valve and a pin centrally suspending the valve within the cap, in combination with the valve-seating screw-stem and a sealing-valve externally of the screw-stem for sealing the inner end of the screw-cap.

3. In a valve for pneumatic tires, the combination with the screw-stem, a screw-cap and a sealing disk valve interposed between the stem and the interior of the cap, of a ring-packing externally of the stem and a screw collar or follower on the stem whereby the screw connection of the cap and stem is sealed.

4. In a valve for pneumatic tires, the combination with the screw-stem, a screw-cap and a sealing-valve interposed between the stem and the interior of the cap, of a ring-packing externally of the stem and a screw collar or follower on the stem having an oblique or wedge-shaped binding and sealing surface impinging upon the ring-packing whereby to compress it inward at the wall-joint.

In testimony whereof I affix my signature in presence of two witnesses.

LYMAN T. SMITH.

Witnesses:
ROBERT T. MERRILL, 2d,
W. C. DOLE.